United States Patent
Reitz et al.

(10) Patent No.: US 8,294,934 B2
(45) Date of Patent: Oct. 23, 2012

(54) CONSUMABLE SERIAL NUMBER TRACKING IN A MANAGED SERVICES HOSTED ENVIRONMENT

(75) Inventors: Jeremy L. Reitz, Marion, NY (US); Matthew Scrafford, Fairport, NY (US); Jason Tsongas, Rochester, NY (US); Lawrence W. Meyer, Fairport, NY (US); Jeffrey E. Mylott, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 663 days.

(21) Appl. No.: 12/480,910

(22) Filed: Jun. 9, 2009

(65) Prior Publication Data
US 2010/0309506 A1    Dec. 9, 2010

(51) Int. Cl.
*G06F 15/00* (2006.01)
(52) U.S. Cl. .......................................... 358/1.15; 705/40
(58) Field of Classification Search .................. None
See application file for complete search history.

(56) References Cited

U.S. PATENT DOCUMENTS

| | | | |
|---|---|---|---|
| 6,643,031 B1 * | 11/2003 | Takano et al. .................. 358/1.9 |
| 6,644,771 B1 | 11/2003 | Silverbrook | |
| 6,702,417 B2 | 3/2004 | Silverbrook | |
| 7,146,112 B2 | 12/2006 | Phipps et al. | |
| 7,237,771 B2 | 7/2007 | Lang et al. | |
| 7,529,491 B2 | 5/2009 | Rommelmann et al. | |
| 7,733,534 B2 * | 6/2010 | Murakami .................... 358/3.13 |
| 2002/0077979 A1 * | 6/2002 | Nagata ............................. 705/40 |
| 2003/0025954 A1 * | 2/2003 | Takano et al. ................. 358/536 |
| 2003/0164442 A1 * | 9/2003 | Beusch ....................... 250/208.1 |
| 2005/0219628 A1 * | 10/2005 | Yasutomi et al. ............ 358/3.16 |
| 2007/0071459 A1 | 3/2007 | Nakazato | |
| 2007/0091369 A1 * | 4/2007 | Liu et al. ...................... 358/1.18 |
| 2007/0188776 A1 | 8/2007 | Lapstun et al. | |
| 2007/0200890 A1 | 8/2007 | Silverbrook | |
| 2008/0030783 A1 * | 2/2008 | Marshall et al. ............. 358/1.16 |
| 2008/0133384 A1 * | 6/2008 | Nagata ............................. 705/28 |
| 2009/0010658 A1 * | 1/2009 | Chan ............................... 399/12 |
| 2009/0112738 A1 * | 4/2009 | Nagata ............................. 705/28 |

* cited by examiner

*Primary Examiner* — Twyler Haskins
*Assistant Examiner* — Helen Q Zong
(74) *Attorney, Agent, or Firm* — Gibb & Riley, LLC (57) ABSTRACT

A method stores serial numbers within memories of customer replaceable units that are used within printing devices. When one or more of the customer replaceable units are replaced, the method causes the printing devices to output to a computer the serial numbers of the customer replaceable units that are replaced. The method then analyzes the serial numbers using the computer to determine which specific customer replaceable unit was used within a specific printing device.

15 Claims, 5 Drawing Sheets

CONSUMABLE SERIAL NUMBER TRACKING IN A MANAGED SERVICES HOSTED ENVIRONMENT

BACKGROUND AND SUMMARY

Embodiments herein generally relate to electrophotographic printers and copiers or reproduction machines, and more particularly, concerns customer replaceable units that include serial numbers within their memory, where the serial numbers are utilized to identify the specific machines in which the customer replaceable units were used and to track proper usage of such customer replaceable units.

Printers and other printing devices (facsimile machines, copiers, multi-function machines, etc.) constantly need replacement of various printing supplies and devices. Often, businesses contract with service agencies that keep the printing devices operating properly and provide the necessary supplies to allow the printing devices to perform their operations. In order to control costs and ensure that various items are utilized as intended by the service agencies, the embodiments herein allow parts that are often replaced by the customer (customer replaceable units) to be tracked more easily through the use of serial number information maintained within the memories of the customer replaceable units.

For example, one computer-implemented method embodiment herein stores serial numbers within memories of customer replaceable units that are used within printing devices. The customer replaceable units or modules can comprise, for example, photoreceptors, fusers, drums, rollers, toner cartridges, ink cartridges, etc., and are items that are usually replaced by either a customer or an end user (and do not require the services of a trained service technician). When one or more of the customer replaceable units (e.g. toner cartridges) are replaced, the method causes the printing devices to output to a computer the serial numbers of the customer replaceable units that are replaced. The method then analyzes the serial numbers using the computer to determine which specific customer replaceable unit was used within a specific printing device.

Thus, for example, with embodiments herein if a help desk event is outstanding for the specific printing device, the method closes the help desk event if the specific customer replaceable unit resolves the help desk event (using the computer). The method can also determine whether the specific customer replaceable unit was used within multiple printing devices, using the computer. The method can also determine whether the customer replaceable units are used with intended specific printing devices or other non-intended printing devices.

The method measures the amount of useful life (e.g., amount of toner) remaining within customer replaceable units that are removed from the specific printing device. This allows the method to use the computer to determine the efficiency with which the specific printing device utilizes the customer replaceable units (based on the amount of useful life remaining within the customer replaceable units removed from the specific printing device).

Other embodiments include a computerized system that has a first computer that stores serial numbers within memories of customer replaceable units that are used within printing devices. A second computer receives output from a plurality of printing devices, when one or more of the customer replaceable units are replaced. This "output" comprises the serial numbers of the customer replaceable units that are replaced. The second computer analyzes the serial numbers to determine which specific customer replaceable unit was used within a specific printing device.

If a help desk event is outstanding for the specific printing device, the second computer automatically closes the help desk event (if the specific customer replaceable unit resolves the help desk event). The second computer can also determine whether the specific customer replaceable unit was used within multiple printing devices. The second computer can similarly determine whether customer replaceable units are used within the intended specific printing devices.

The second computer can also measure the amount of useful life remaining within customer replaceable units removed from the specific printing device and determine the efficiency with which the specific printing device utilizes the customer replaceable units based on the amount of useful life remaining within the customer replaceable units removed from the specific printing device.

Additionally, the embodiments herein include a printing device that comprises at least one printing engine (having the customer replaceable units), at least one engine controller operatively connected to the printing engine, at least one computer storage medium operatively connected to the engine controller, and an input/output interface operatively connected to the engine controller. The customer replaceable units comprise a memory unit and each of the memory units within the customer replaceable units stores a unique corresponding serial number for that unit. The serial number is stored within the memory unit at the time of manufacturing the customer replaceable units.

The engine controller reads the serial number from the memory unit and stores the serial number within the computer storage medium. The input/output interface provides serial numbers of the customer replaceable units to an external computer when one or more of the customer replaceable units needs replacement. These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
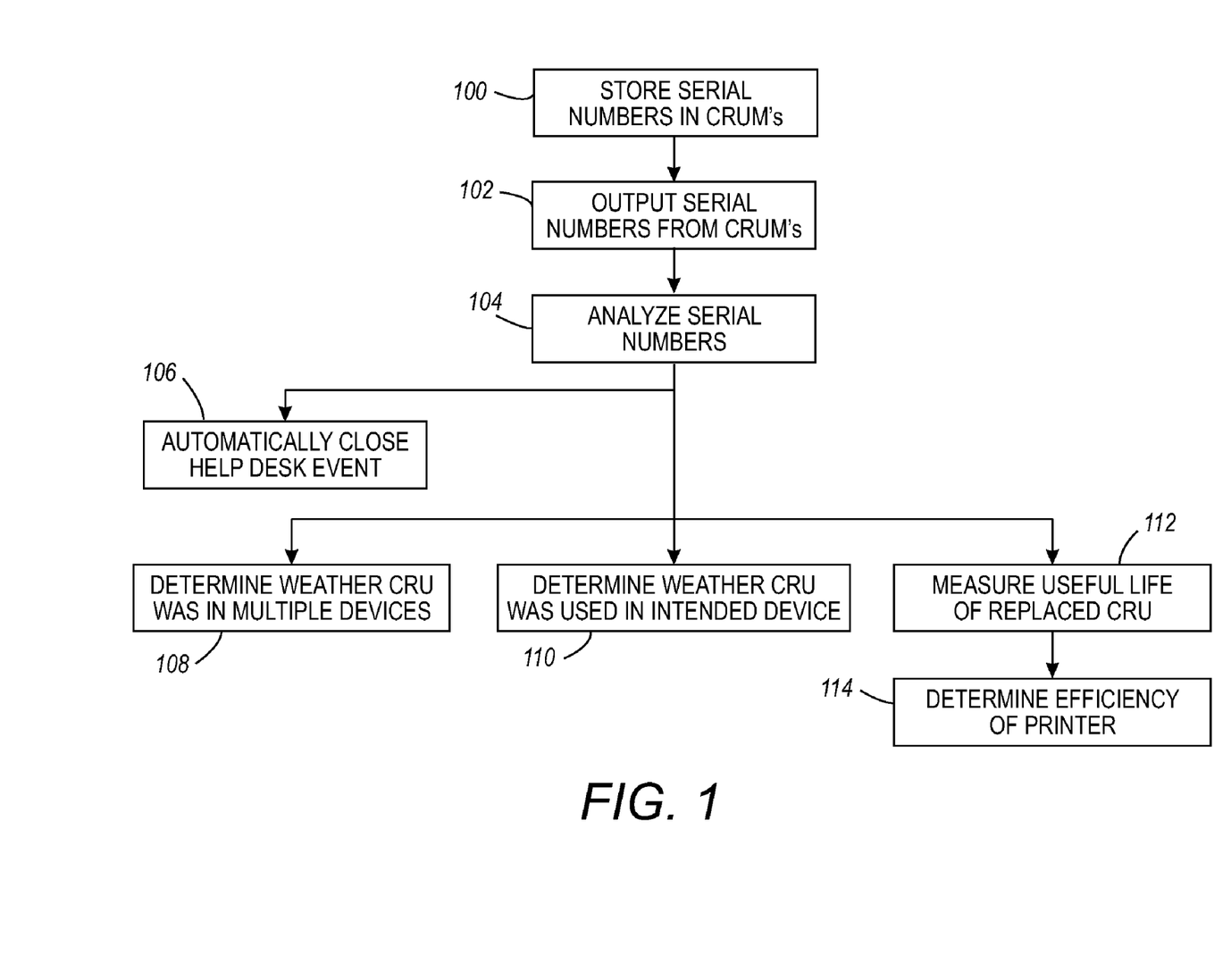
FIG. 1 is a flow diagram illustrating method embodiments herein.

One computer-implemented method embodiment herein is shown in flowchart for in FIG. 1. In item 100, the method stores serial numbers within memories (CRUM) of customer replaceable units (CRU) that are used within printing devices. The customer replaceable units (or modules) can comprise, for example, photoreceptors, fusers, drums, rollers, toner cartridges, ink cartridges, etc.; and are items that are usually replaced by either a customer or an end user (and usually do not require the services of a trained service technician). Customer replaceable units are items that are well-known to those ordinarily skilled in the art (for example, see U.S. Pat. Nos.

7,146,112 and 7,529,491, the complete disclosures of which are incorporated herein by reference) and are available from manufacturers such as Xerox Corp., Norwalk Conn., USA. Therefore, a detailed discussion of such customer replaceable units is not included herein so as to focus the reader on the salient features of the disclosed embodiments.

When one or more of the customer replaceable units (e.g. toner cartridges) are replaced, in item 102, the method causes the printing devices to output (to a computer) the serial numbers of the customer replaceable units that are replaced. In item 104, the computer then analyzes the serial numbers to determine which specific customer replaceable unit was used within a specific printing device.

With such analysis 104, the embodiments herein can perform a number of different activities, some of which are listed in FIG. 1. For example, if a help desk event is outstanding for a specific printing device, the method can automatically (without additional human action) close the help desk event if the specific customer replaceable unit resolves the help desk event (using the computer) as shown in item 106. For example, a user may create a helpdesk event by calling regarding an error message indicating a low toner condition. If the user then subsequently replaces the toner cartridge, the embodiments herein will provide data that the specific toner cartridge was replaced within the specific printing device that was the subject of the helpdesk event. Once this information is obtained, the embodiments herein will automatically close the helpdesk event, even if the user does not call back to indicate that the replacement toner cartridge resolved the error message.

As shown in item 108, the method can also determine whether the specific customer replaceable unit was used within multiple printing devices, using the computer. In item 110, the method can also determine whether the customer replaceable units are used within the intended specific printing devices or whether it is used in some other non-intended printing devices.

In item 112, the method can physically measure the amount of useful life (e.g., amount of toner) remaining within customer replaceable units that are removed from the specific printing device when the customer replaceable units are returned for refilling and reconditioned. This allows the method to use the computer to determine the efficiency with which the specific printing device utilizes the customer replaceable units (based on the amount of useful life remaining within the customer replaceable units removed from the specific printing device) in item 114.

Figure 2A:
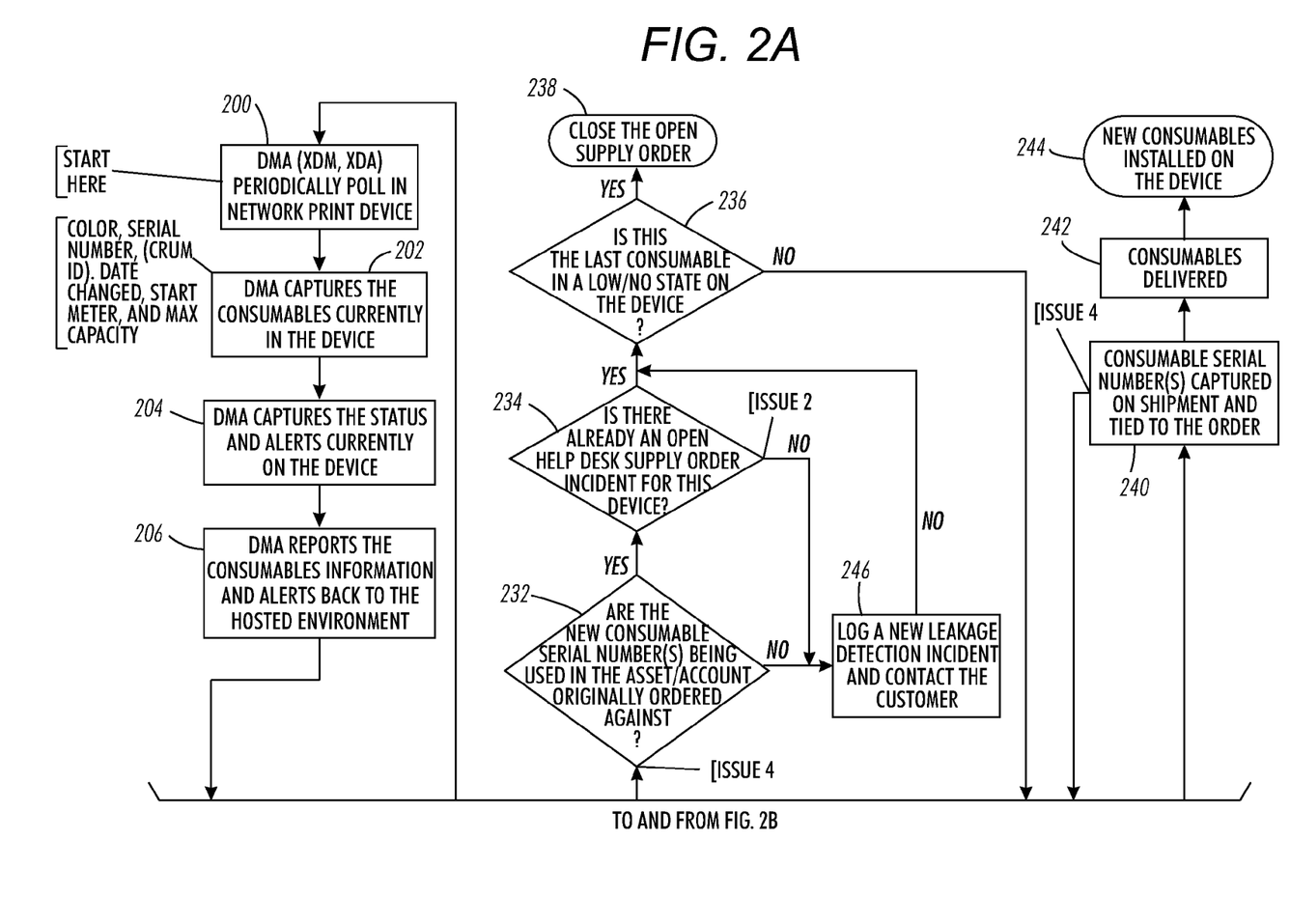
FIGS. 2A and 2B are flow diagrams illustrating method embodiments herein.
Figure 2B:
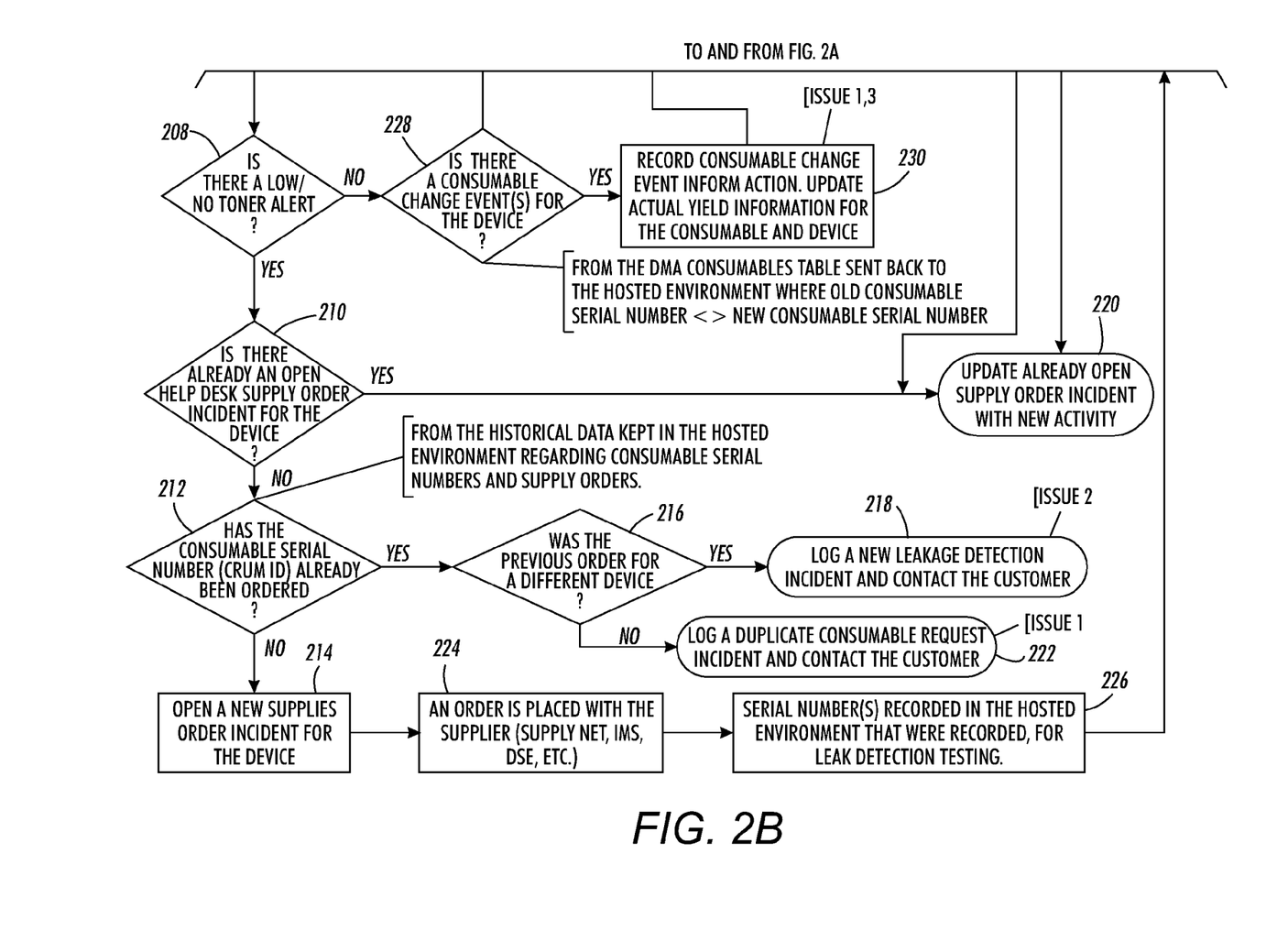

FIG. 2 is a flowchart that illustrates consumable serial number tracking in a managed services hosted environment. Currently there are a multitude of issues relating to accurately tracking and proactively ordering the consumables used in printing devices that could be solved by knowing the exact time an item, such as a toner cartridge, is replaced in a hosted environment. Four of such "issues" are outlined below, and labeled in FIG. 2 as Issue 1-Issue 4. These issues are explained below using a toner cartridge as an example; however, those ordinarily skilled in the art would understand that the embodiments herein are applicable to any replaceable component that is utilized within printing devices.

With respect to Issue 1, the actual replacement event of a cartridge in a device is not conventionally tracked; however, embodiments herein do track such information which can allow incidents in the help desk environment to be closed upon cartridge replacement. This reduces the number of duplicate alerts for low or no toner, thus saving labor in researching and closing false positive alerts.

The tracking of actual cartridge replacement in Issue 1 also allows tracking of cartridge usage when toner cartridges are shipped in pack multiples of greater than one. The cartridge change event could be used to trigger the on-hand balance of supplies for the machine to be decremented by one, if it is currently greater than zero. Capturing of this change event is also useful for understanding the true consumable yield for any given device. With the actual cartridge replacement information, the embodiments herein can provide highly accurate predictive ordering routines and provide better optimization tools due to knowing the true nature of coverage being produced on each specific device.

Issue 2 addresses leakage detection and toner reuse in multiple machines. Leakage detection occurs when supplies intended for one machine are used for a different machine. This can become a problem if the machine for which the supplies were intended to be utilized is being serviced under a contract where supplies are not charged individually, but the supplies are taken from such a machine and utilized for a second machine where supplies should be charged individually. This can decrease the profit under the first machine and allow the second machine to essentially receive "free" supplies.

In a proactively managed environment, the low and no toner alerts from devices are used to trigger incidents to re-order supplies for a device. One of the issues keeping this from being a fully automated process is that necessary controls are not in place in conventional systems to track and manage certain events. Whether a customer moves a cartridge from one machine to another is something that cannot be tracked with conventional systems. This can result in multiple supplies re-orders for the same cartridge, if the depleted cartridge is moved from machine to machine. These conditions that occur with respect to Issue 2 could either be done in good faith by a customer needing toner in a second device, or could be maliciously done to receive extra toner for a group of machines in an all-inclusive contract.

Issue 3 provides a good measure of how much unused toner is still available. By knowing this metric it is possible to change the proactive replenishment methods for accounts which tend to replace cartridges that still contain substantial quantities of unused toner. This would ensure that the optimal amount of toner is used before toner cartridge replacement.

Issue 4 concerns toner cartridges being ordered for one account and contract and then actually being utilized for machines handled under another account. This condition happens when toner is re-sold to a different account than the one to which it was originally shipped. However, because embodiments herein capture the cartridge serial numbers on shipment and tie such serial numbers to the original order, it is possible to capture and report cartridges which ended up in the incorrect managed environment.

In order to solve Issues 1-3 in managed services hosted environments, the serial number (CRUM ID) on for the toner cartridge is provided to the management information block (MIB) of the printing device, and then captured and reported back to the hosted environment. Then, the device management application (DMA), such as device manger (DM), can track the serial numbers of all toners in a machine and capture the following information regarding the consumables in each device whenever a serial number change is detected: Color, Serial Number (CRUM ID), Date Changed, Start Meter, and Max Capacity, etc. This information is then reported back to the hosted environment for additional analysis across all other managed services accounts.

In order to solve Issue 4 where consumables end up being used on accounts other than those for which they were originally ordered, the consumable serial number is captured on the shipment of the material and tied to the original order. This feature, used in conjunction with the others mentioned above allows tracking of consumables usage in accounts other than the originally ordered account.

Referring to FIG. 2, in item 200, the device management application (DMA, system device manager (SDM), XDA, etc.) periodically polls the network print driver. In item 202, the DMA captures the consumables (customer replaceable units or other replaceable items) currently in the printing device. Next, in item 204, the DMA captures the status and alerts (warning messages) currently maintained by the computer memory within the printing device. In item 206, the DMA reports the consumable information, printer identification, and alerts back to the hosted environment.

In item 208, the embodiments herein determine (using the previous example of consumed toner within a toner cartridge) if there is a low/no toner alert. If the answer is no, the embodiment proceeds to item 228 and determines if there is a consumable change event for the device. If the answer in item 208 is yes, the embodiment proceeds to 210 and determines if there is already an open help desk supply order incident for the device (relating to the low toner condition).

If, in item 210, the answer is no, the method proceeds to item 212 and determines if the consumable serial number (CRUM ID) has already been ordered. If the answer is yes in item 210, the method proceeds to item 220 and updates the already open supply order incident with new activity.

Referring back to item 212, if the consumable serial number (CRUM ID) has not already been ordered, the method proceeds to item 214 and opens a new supplies order incident for the device. If the consumable serial number (CRUM ID) has already been ordered in item 212, the method proceeds to item 216 and determines if there was a previous order for a different device. If the answer is yes in item 216, the method proceeds to item 218 and logs a new leakage detection incident and contacts the customer, which directly addresses Issue 2, discussed above. In item 216, if the answer is no, the method logs a duplicate consumable request and contacts the customer in item 222, which directly addresses Issue 1, discussed above.

Referring back to item 214, the method then places an order with the supplier in item 224. Next, serial numbers are recorded, in the hosted environment, for cartridges that were reordered (for leak detection testing) in item 226. The method then captures consumable serial numbers on the shipment and ties the serial numbers to the order in item 240. Next, in item 242, the consumables are delivered, and then the new consumables are installed on the device in item 244.

Referring back to item 228, if the answer is no, the method proceeds back to item 200 and repeats the cycle. However, if the answer is yes, the method proceeds to item 230 which records consumable change event information, and updates actual yield information for the consumable device (this directly addresses Issues 1 and 3, discussed above).

Next, in item 232, the method asks if there are new consumable serial number(s) being used in the asset/account that was originally ordered against. If not, the method logs a new leakage detection incident and contacts the customer in item 246. If the answer is yes, the method proceeds to item 234, which determines if there is already an open help desk supply order incident for the device (which directly addresses Issue 2, discussed above). In item 234, if the answer is no, the method logs a new leakage detection incident and contacts the customer in item 246. If yes, the method proceeds to item 236 and determines if the last consumable is in a low/no state on the device. If yes, the method proceeds to item 238 and closes the open supply order. If no, item 236 proceeds to item 220 and updates the already open supply order incident with new activity.

Figure 3:
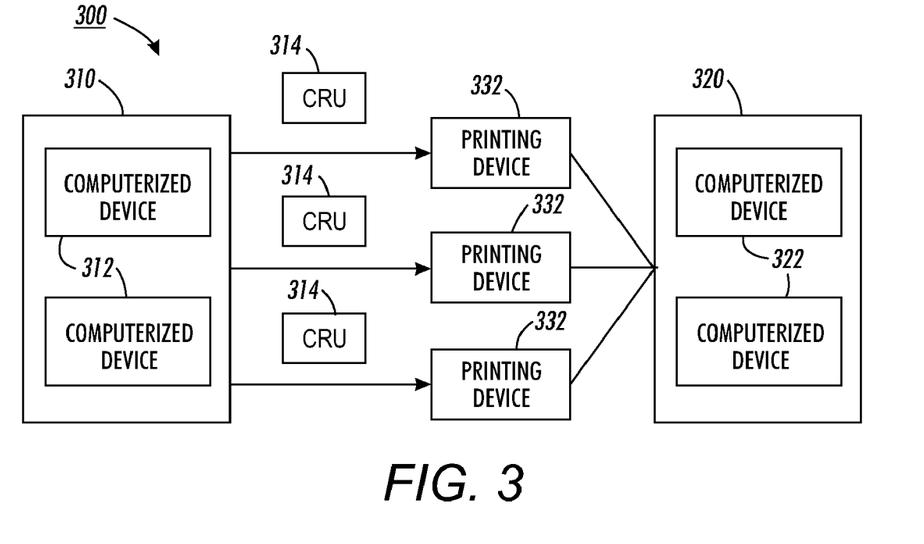
FIG. 3 is a schematic diagram of a printing system according to embodiments herein.

Another embodiment shown in FIG. 3, is a hosted environment computerized system 300 that has at least one first computer (or computerized device or tool) 312 that stores serial numbers within memories of customer replaceable units 302 that are used within printing devices. All computers and computerized devices mentioned herein can perform the operations mentioned by executing instructions or computer code that is stored in a corresponding storage device or storage medium. The first computer 312 can represent one or more computers that are utilized within a first manufacturing location 310 that manufacturers and/or refurbishes customer replaceable units 314. The first computer 312 could represent the one or more tools that program the memories within the customer replaceable units 314.

One or more second computers 322 receive output from a plurality of printing devices 332, when one or more of the customer replaceable units 314 are replaced. The second computer 322 can be located, for example, at a service location 320 that is in communication with the various printing devices 332 that could be located at, for example, a customer location 330. The output provided by the printing devices 332 includes many different forms of data, which can included the printer identification and serial numbers of the customer replaceable units 314 that are replaced. The second computer 322 analyzes the serial numbers to determine which specific customer replaceable unit was used within a specific printing device.

Therefore, if a help desk event is outstanding for the specific printing device, the second computer 322 closes the help desk event (if the specific customer replaceable unit resolves the help desk event). The second computer 322 can also compare the identifications of printing devices returning serial numbers of customer replaceable units to determine whether a specific customer replaceable unit was used within multiple printing devices. Thus, if two differently identified printing devices return the same serial number of a used customer replaceable unit, this would indicate that the same customer replaceable unit was used within multiple printing devices. The second computer 322 can similarly determine whether customer replaceable units 314 were used within the intended specific printing devices by comparing the serial number of the customer replaceable unit with the identification of the printing device for which the customer replaceable unit was intended to be used.

The second computer 322 can also measure the amount of useful life remaining within customer replaceable units 314 removed from a specific printing device and determine the efficiency with which the specific printing device utilizes the customer replaceable units based on the amount of useful life remaining within the customer replaceable units removed from the specific printing device. Thus, for example, if a specifically identified printing device consistently returns customer replaceable units that have a remaining useful life above a given standard, that machine (or its dedicated users or service personnel) can be investigated and/or trained to more fully utilize the useful life of the customer replaceable units.

Figure 4:
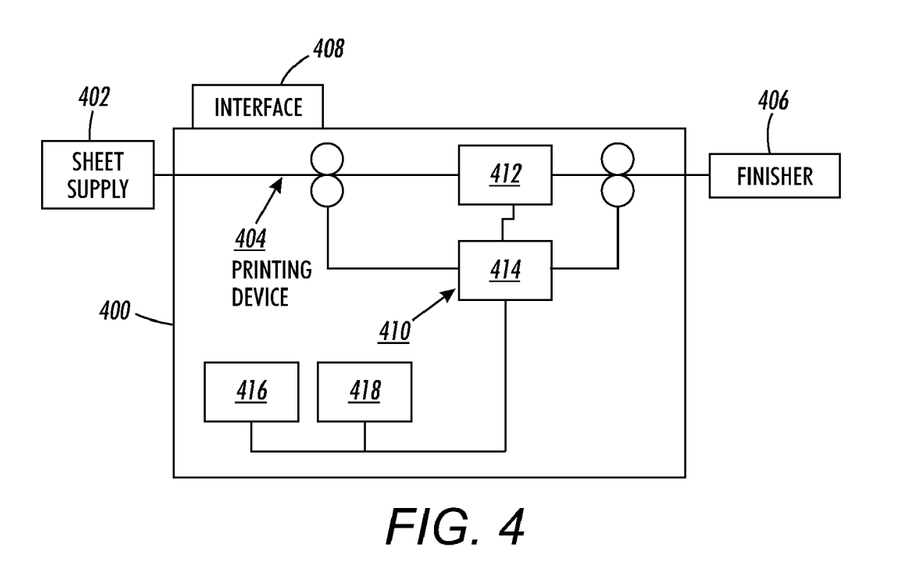
FIG. 4 is a schematic diagram of a printing device according to embodiments herein.

Additionally, as shown in FIG. 4, the embodiments herein include a printing device having at least one engine controller 416 that is operatively connected to a printing engine 410. The engine controller 416 uses software, potentially stored in a memory device (magnetic storage medium, etc.) 418, to control the operations of the printing engine 410. Engine controllers and printing devices are items that are well known to those ordinarily skilled in the art (for example, see U.S. Pat.

No. 7,237,771 the complete disclosure of which is incorporated herein by reference) and are available from manufacturers such as Xerox Corp., Norwalk Conn., USA. Therefore, a detailed discussion of such items is not included herein so as to focus the reader on the salient features of the disclosed embodiments.

In addition, the printing device 400 includes an interface or digital front end (DFE) 408 that can comprise a scanner, a graphic user interface, network connections, a standard service interface, and/or other input output connections. Incoming prints jobs are sent to the engine via the interface 408. The interface 408 raster image processes (RIPS) the job and sends it to the engine controller 416 to be imaged using the customer replaceable units 412/414, transferred, and finally fused to the sheets of media (substrate). The printing device 400 draws sheets of media from the sheet supply 402 and utilizes a paper path 404 to feed the sheets through the printing engine 410. A finisher unit 406 can process the sheets after they have been printed by stapling, binding, folding, etc., the sheets.

Figure 5:
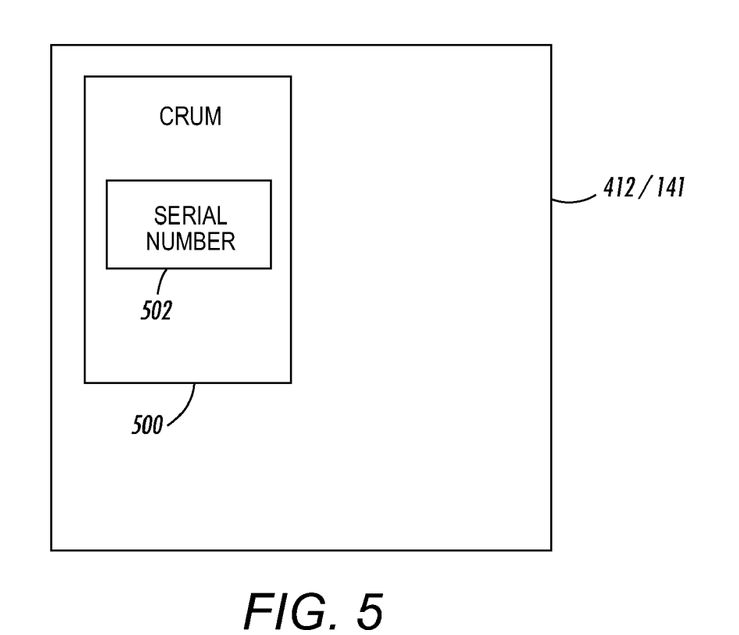
FIG. 5 is a schematic diagram of a printing device according to embodiments herein.

The customer replaceable units 412/414 comprise a memory unit 500 (e.g., non-volatile memory) and each of the memory units within the customer replaceable units stores a unique corresponding serial number 502 for that unit (see FIG. 5). The serial number 502 is stored within the memory unit 500 at the time of manufacturing or refurbishing the customer replaceable units.

The engine controller 416 reads the serial number from the memory unit and stores the serial number within the computer storage medium 418. The input/output interface 408 provides serial numbers of the customer replaceable units 412/414 and the printer ID to an external computer (e.g., a second computer 322) when one or more of the customer replaceable units 412/414 needs replacement.

Embodiments herein enable unused supplies to be tracked and reported and provide a trigger for much more accurate consumable yields for any given device. Further, the embodiments herein enable leakage detection and can stop erroneous multiple re-orders for the same consumable serial number. The embodiments herein provide tracking and usage data of the consumable against an ordering account and can provide insight into the actual area coverage for any given device. This data can be fed back into the optimization tools to recommend different device model mixes. Also, the embodiments herein allow closing of supply ordering incidents on an actual change of consumable on the device. This leads to much greater accuracy in order to usage time lines.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The word "printer" or "image output terminal" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

What is claimed is:

1. A computer-implemented method comprising:
    storing serial numbers within memories of customer replaceable units that are used within printing devices;
    when one or more of said customer replaceable units are replaced, causing said printing devices to output said serial numbers of said customer replaceable units that are replaced to a computer;
    analyzing said serial numbers using said computer to determine which specific customer replaceable unit was used within each specific printing device;
    ordering a replacement for said specific customer replaceable unit, using said computer;
    determining whether said specific customer replaceable unit was used within multiple printing devices, using said computer; and
    canceling multiple orders of said replacement for said specific customer replaceable unit based on said specific customer replaceable unit being used within multiple printing devices, using said computer.

2. The method according to claim 1, if a help desk event is outstanding for said specific printing device, further comprising closing said help desk event if said specific customer replaceable unit resolves said help desk event, using said computer.

3. The method according to claim 1, further comprising measuring an amount of useful life remaining within customer replaceable units removed from said specific printing device; and
    determining an efficiency with which said specific printing device utilizes said customer replaceable units based on said amount of useful life remaining within said customer replaceable units removed from said specific printing device, using said computer.

4. The method according to claim 1, further comprising determining whether customer replaceable units are used with intended specific printing devices.

5. A computer-implemented method comprising:
    storing serial numbers within memories of toner cartridges that are used within printing devices;
    when one or more of said toner cartridges are replaced, causing said printing devices to output said serial numbers of said toner cartridges that are replaced to a computer; and
    analyzing said serial numbers using said computer to determine which specific toner cartridge was used within each specific printing device;

ordering a replacement for said specific toner cartridge, using said computer;

determining whether said specific toner cartridge was used within multiple printing devices, using said computer; and canceling multiple orders of said replacement for said specific toner cartridge based on said specific toner cartridge being used within multiple printing devices, using said computer.

6. The method according to claim 5, if a help desk event is outstanding for said specific printing device, further comprising closing said help desk event if said specific toner cartridge resolves said help desk event, using said computer.

7. The method according to claim 5, further comprising measuring an amount of toner within toner cartridges removed from said specific printing device; and determining an efficiency with which said specific printing device utilizes said toner cartridges based on said amount of useful life remaining within said toner cartridges removed from said specific printing device, using said computer.

8. The method according to claim 5, further comprising determining whether toner cartridges are used with intended specific printing devices.

9. A computerized system comprising:

a first computer that stores serial numbers within memories of customer replaceable units that are used within printing devices; and a second computer that, when one or more of said customer replaceable units are replaced, receives output from a plurality of printing devices, said output comprising said serial numbers of said customer replaceable units that are replaced, and said second computer analyzing said serial numbers to determine which specific customer replaceable unit was used within each specific printing device;

said second computer ordering a replacement for said specific customer replaceable unit;

said second computer determining whether said specific customer replaceable unit was used within multiple printing devices; and said second computer canceling multiple orders of said replacement for said specific customer replaceable unit based on said specific customer replaceable unit being used within multiple printing devices.

10. The system according to claim 9, if a help desk event is outstanding for said specific printing device, said second computer closes said help desk event if said specific customer replaceable unit resolves said help desk event.

11. The system according to claim 9, said second computer measuring an amount of useful life remaining within customer replaceable units removed from said specific printing device and determining an efficiency with which said specific printing device utilizes said customer replaceable units based on said amount of useful life remaining within said customer replaceable units removed from said specific printing device.

12. The system according to claim 9, said second computer determining whether customer replaceable units are used with intended specific printing devices.

13. A computer-implemented method comprising:

storing serial numbers within memories of customer replaceable units that are used within printing devices;

when one or more of said customer replaceable units are replaced, causing said printing devices to output said serial numbers of said customer replaceable units that are replaced to a computer;

analyzing said serial numbers using said computer to determine which specific customer replaceable unit was used within each specific printing device;

ordering a replacement for said specific customer replaceable unit, using said computer;

determining whether said specific customer replaceable unit was used within multiple printing devices, using said computer;

canceling multiple orders of said replacement for said specific customer replaceable unit based on said specific customer replaceable unit being used within multiple printing devices, using said computer; and determining whether customer replaceable units are used with intended specific printing devices according to requirements of a service contract for said printing devices using said computer to detect improper leakage if said customer replaceable units.

14. The method according to claim 13, if a help desk event is outstanding for said specific printing device, further comprising closing said help desk event if said specific customer replaceable unit resolves said help desk event, using said computer.

15. The method according to claim 13, further comprising measuring an amount of useful life remaining within customer replaceable units removed from said specific printing device; and determining an efficiency with which said specific printing device utilizes said customer replaceable units based on said amount of useful life remaining within said customer replaceable units removed from said specific printing device, using said computer.

* * * * *